United States Patent
Vancraeynest (12) 
(10) Patent No.: US 6,859,444 B1
(45) Date of Patent: Feb. 22, 2005

(54) METHOD AND APPARATUS FOR HANDOVER IN TDMA MOBILE COMMUNICATIONS SYSTEM

(75) Inventor: Jan Vancraeynest, White Plains, NY (US)

(73) Assignee: UTStarcom, Inc., Alameda, CA (US)

( * ) Notice: Subject to any disclaimer, the term of this patent is extended or adjusted under 35 U.S.C. 154(b) by 0 days.

(21) Appl. No.: 09/413,658

(22) Filed: Oct. 6, 1999

(51) Int. Cl.[7] .............................................. H04Q 7/00
(52) U.S. Cl. ....................... 370/331; 370/345; 455/403; 455/436
(58) Field of Search ................................ 370/331, 332, 370/349, 329, 337, 336, 350, 450, 347, 348, 503, 508, 375, 345; 455/403, 515, 516, 550.1, 575.1, 561, 436, 452.1, 442, 439, 443, 455, 422.1, 444, 450, 509

(56) References Cited

U.S. PATENT DOCUMENTS

| | | | |
|---|---|---|---|
| 4,435,840 A | | 3/1984 | Kojima et al. ................. 455/33 |
| 5,101,501 A | | 3/1992 | Gilhousen et al. ............. 455/33 |
| 5,159,593 A | | 10/1992 | D'Amico et al. .......... 370/95.3 |
| 5,175,867 A | | 12/1992 | Wejke et al. ............... 455/33.1 |
| 5,257,402 A | * | 10/1993 | Crisler ....................... 455/33.2 |
| 5,323,446 A | | 6/1994 | Kojima et al. ................. 379/60 |
| 5,410,588 A | * | 4/1995 | Ito .............................. 379/58 |
| 5,436,906 A | * | 7/1995 | Kasuya et al. ............. 370/95.3 |
| 5,479,410 A | * | 12/1995 | Paavonen ................... 370/95.3 |
| 5,483,668 A | * | 1/1996 | Malkamaki et al. ........ 455/33.2 |
| 5,613,203 A | | 3/1997 | Dupuy et al. .............. 455/33.2 |
| 5,740,166 A | * | 4/1998 | Ekemark et al. ............ 370/331 |
| 5,822,313 A | | 10/1998 | Malek et al. ................ 370/332 |
| 5,898,929 A | * | 4/1999 | Haartsen ...................... 455/462 |
| 5,901,144 A | | 5/1999 | Maki et al. ................. 370/330 |
| 5,903,834 A | | 5/1999 | Wallstedt et al. ........... 455/422 |
| 6,002,673 A | * | 12/1999 | Kahn et al. .................. 370/252 |
| 6,088,590 A | * | 7/2000 | Anderson et al. ........... 455/437 |
| 6,130,886 A | * | 10/2000 | Ketseoglou et al. ........ 370/347 |
| 6,226,283 B1 | * | 5/2001 | Neumiller et al. .......... 370/340 |
| 2002/0102977 A1 | * | 8/2002 | Shi ............................ 455/437 |

FOREIGN PATENT DOCUMENTS

| | | | | |
|---|---|---|---|---|
| DE | 0935401 A2 | * | 8/1999 | ............ H04Q/7/38 |
| GB | 2 281 177 | | 2/1995 | ............ H04Q/7/38 |

* cited by examiner

Primary Examiner—Edward F. Urban
Assistant Examiner—C. Chow
(74) Attorney, Agent, or Firm—George A. Willman; Felix L. Fischer (57) ABSTRACT

A mobile communications system including a plurality of base stations. The system includes a plurality of mobile telephones. Each mobile telephone communicates with at least a base station from the plurality of base station using a timeslot and a frame. The frame has a plurality of timeslots for the base station to use to communicate with the various of the plurality of mobile telephones in a cell covered by the base station. Each mobile telephone has a single radio capable of communication on various frequencies. The radio is not capable of communicating on different frequencies on adjacent timeslots in a frame. A mobile telephone may establish communication with a first base station on a particular timeslot in a frame. If another timeslot is available in the frame in a second base station, communication may be established with the second base station on another timeslot in the frame. The another timeslot is not next to the particular timeslot if the frequency used on the particular timeslot and the another timeslot are different. If the frequencies used on the particular timeslot and the another timeslot are the same, communication may be established with the second base station on the another timeslot in the frame where the another timeslot is next to the particular timeslot or not next to the particular timeslot.

24 Claims, 8 Drawing Sheets

METHOD AND APPARATUS FOR HANDOVER IN TDMA MOBILE COMMUNICATIONS SYSTEM

CROSS REFERENCE TO RELATED APPLICATIONS

This application is related to application entitled *Method and Apparatus Using Alternate Frames for Handover in TDMA Mobile Communications System* invented by Jan Vancraeynest, Attorney Docket Number 16296.707 which is incorporated herein by reference in its entirety, filed on the same date as the present application.

BACKGROUND OF THE INVENTION

1. Field of the Invention

This invention generally relates to cellular communications systems having mobile subscribers, and more particularly, to a method of controlling handover in the communications of cell site stations with a mobile unit in a TDMA cellular telephone system.

2. Description of the Related Art

Cellular communications systems use a series of sites, known as base stations, to communicate with mobile subscribers. A mobile telephone unit typically communicates with the closest base station, or the base station having the best signal quality. A cellular network often includes a set of many base stations, each base station communicating with mobile telephones in an area known as a cell. As a mobile subscriber moves from one cell to another, eventually the mobile telephone begins to communicate with a new base station covering the new area and ends communication with the old base station covering the old area in which the mobile subscriber was located. This process of beginning communication with a new base station and ending communication with an old base station is known as handoff or handover.

Various systems and techniques have been developed to address problems in handoff. Two examples of patents addressing handoff in cellular communication are U.S. Pat. No. 5,822,313 by Malek and U.S. Pat. No. 5,323,466 by Kojima, both of which are incorporated herein by reference in their entirety. In some systems, simultaneous communication links are established between the mobile unit and the base stations. In some prior systems, the handover process involved the use of dual transceivers in a mobile unit. Such a dual transceiver adds cost, size and power consumption, and reduced reliability to the mobile unit.

SUMMARY OF THE INVENTION

One embodiment of the invention is a mobile communication system including a plurality of base stations. The system includes a plurality of mobile telephones. Each mobile telephone communicates with at least a base station from the plurality of base stations using a timeslot of a frame. The frame has a plurality of timeslots for the base station to use to communicate with the various of the plurality of mobile telephones in a cell covered by the base station. Each mobile telephone has a single radio capable of communication on various frequencies. The radio is not capable of communicating on different frequencies on adjacent timeslots of a frame.

A mobile telephone may establish communication with a first base station on a particular timeslot in a frame, If another timeslot is available in the frame in a second base station, communication may be established with the second base station on another timeslot in the frame. The another timeslot is not next to a particular timeslot if the frequency used on the particular timeslot and the another timeslot are different. If the frequencies used on the particular timeslot and the another timeslot are the same, communication may be established with the second base station on the another timeslot in the frame where the another timeslot is next to the particular timeslot or not next to the particular timeslot.

In various embodiments of the invention, the circuitry that causes communication to be established with the second base station may be comprised by mobile telephone or the equipment coupled to the base stations. Communication established on a particular timeslot may include use of the timeslot for downlink communication on one half frame and for uplink communication on the next half frame.

The circuitry may attempt to establish communication with the second base station if quality of communication with the first base station is below a particular level. Circuitry may drop communication with a base station of quality if communication with the base station is below a particular level. The system capacity may be controlled by adjusting a combination of (a) the particular level of quality of communication with the first base station below which the circuitry attempts to establish communication with the second base station and (b) a particular level of quality of communication with a base station below which the circuitry drops communication with the base station. Such combination may be adjusted automatically based on utilization of system resources and desired communication link reliability.

The second base station may be selected from among a set of base stations based on signal quality between the base stations and the mobile telephone. The second base station may be selected as a base station having the best signal quality between the base station and the mobile telephone coming from among base stations other than the first base station. The mobile telephone may have a list of base stations ordered based on signal quality between base stations and the mobile telephone, and the mobile telephone may include circuitry that selects the second base station as the first available base station on the list. The list may be ordered based on received signal strength indicator (RSSI), frame error rate (FER), or a combination thereof.

The system may include circuitry that reallocates a timeslot in the second base station to allow the reallocated timeslot to be used by the mobile telephone. The second base station may include circuitry that provides the mobile telephone an estimate of the time to prepare or free-up the another timeslot for communication with the second base station.

An embodiment of the invention is a mobile telephone. The mobile telephone includes a single radio not capable of communicating on different frequencies on adjacent timeslots of frame and circuitry that monitors signal quality with various base stations. The mobile telephone also includes circuitry that, when a mobile telephone is in communication with a base station using a particular timeslot or frame, causes the mobile telephone to request communication with a second base station. The mobile telephone is caused to request communication with the second base station based on measured single quality of the respective base stations. A timeslot used to communicate with the second base station is not next to the particular timeslot of the frame if the frequencies used on the particular timeslot and the another timeslot are different. A timeslot used to communicate with the second base station is next to the particular timeslot or not next to the particular timeslot if the frequencies used on the particular timeslot and the another timeslot are the same.

An embodiment of the invention is a base station comprising of a radio capable of communication with mobile telephones. The base station includes circuitry that establishes communication with a mobile telephone. If the mobile telephone is in communication with another base station having a radio capable of communication with mobile telephones and the mobile telephone uses a particular timeslot in a frame to communicate with the another base station, the circuitry, according to one embodiment of the invention, establishes communication with the mobile telephone using a timeslot not next to the particular timeslot in a frame if the frequencies used on the particular timeslot and the another timeslot are different. The circuitry establishes communication with the mobile telephone using a timeslot next to the particular timeslot or not next to the particular timeslot if the frequencies used on the particular timeslot and the another timeslot are the same.

An embodiment of the invention includes a method of seamless handover in a telecommunications system. When a mobile telephone has established communication with a first base station on a particular timeslot in a frame, if another timeslot is available in the frame in the second base station, communication is established with the second base station on the another timeslot in the frame, where the another timeslot is not next to the particular timeslot if the frequencies used on the particular timeslot and the another timeslot are different. If the frequencies used on the particular timeslot and the another timeslot are the same, and communication is established with the second base station on the another timeslot in the frame, where the another timeslot is next to the particular timeslot or not next to the particular timeslot.

DETAILED DESCRIPTION

The handover process in mobile communications presents some challenges. For example, as a mobile telephone switches from communicating with a first base station to communicating with a second base station, interruption in the communication may occur. Such interruption may be audible, in the form of a click, other noise or simply silence. Avoiding this problem by providing dual radios for allowing for simultaneous communication with multiple base stations is expensive.

There are also performance impacts from the practice of adding enough timeslots in a frame so that there will always be two non-adjacent timeslots which can be used for communications (i.e., at least seven timeslots per half frame). For example, there may be increased round-trip delay for a given timeslot length. Further, such an approach is not always practical or desirable especially if it is required to have compatibility with the existing system standards that use fewer than seven timeslots per frame. One embodiment of the invention is a system in which there are no more than six timeslots per half frame.

An embodiment of the invention helps to address some of these problems by communicating with more than one base station on different timeslots. The timeslots are selected in order to accommodate limitations of the mobile telephone equipment. For example, the mobile telephone may not be able to transmit on different frequencies on adjacent timeslots. Such mobile telephones may be limited because their radios have slow frequency synthesizers that are capable of using the same frequency only on adjacent timeslots. The base station, however, is able to communicate using different frequencies on adjacent timeslots. Therefore, according to one embodiment of the invention, a timeslot is selected in the second base station that is not adjacent to the timeslot used by the first base station, if such a timeslot is available only on a different frequency from the one used by the first base station. Alternatively, a timeslot may be selected as one adjacent to the one used by the current base station if such timeslot uses the same frequency as is used by the timeslot used by the first base station. If such timeslot is not available in the second base station, but another timeslot is, the second base station will reallocate its timeslots to make available a suitable timeslot for the mobile telephone from the first base station.

An embodiment of the invention is directed to a time division multiple access (TDMA) system. In a TDMA system, multiple conversations are handled by dividing time up into a series of frames. Each frame is divided into a set of timeslots. A burst of data from each conversation may be transmitted on a timeslot of each frame. Thus, by dividing each frame into timeslots, multiple conversations can be handled on a shared communications channel.

According to an embodiment of the invention, whether a mobile telephone attempts to connect to another base station or attempts to disconnect with the current base station is determined by a predetermined level of communications quality with respect to base stations. For example, according to an embodiment of the invention, a mobile telephone attempts to communicate with a second base station if signal quality of communication with the first base station is below a predetermined threshold level. If communication quality with the first base station is below a predetermined threshold level, then communication with the first base station is dropped. The threshold values of signal quality for dropping or adding a station may be different for different base stations. Also, the base stations themselves may broadcast the threshold values, and the mobile telephones will initiate or drop communication with base stations according to such broadcasted threshold values.

The threshold levels for initiating or dropping connections with base stations determine the number of mobile telephones that are communicating with more than one base station. As more mobile telephones communicate with more base stations, fewer base station resources are available. Thus, the availability of system resources may be controlled by selecting the threshold levels.

According to one embodiment of the invention, the mobile telephone maintains an ordered list of base stations according to link quality, potential of the wireless link between the base station and mobile telephone signal quality. Such signal quality may be measured as RSSI or FER, other metrics, or a combination thereof. When the mobile telephone determines that it should initiate communication with another base station, it selects the second base station from the list of base stations, choosing the base station having the best link quality first. If that base station is not available, another base station is selected also based on link quality. Such a process may be continued until an available base station is found. Alternatively, the mobile telephone may attempt to communicate with a base station with which it has already attempted to communicate after trying another base station or stations.

Figure 1A:
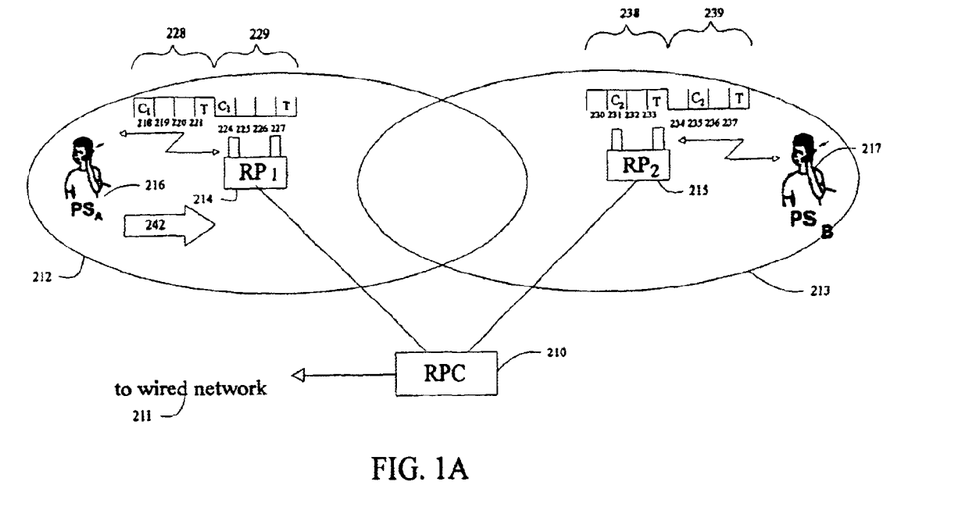
FIGS. 1A, 1B and 1C illustrate a mobile communications system illustrating different connectivity as a subscriber in a mobile communications system moves from the coverage of one base station to another, according to an embodiment of the invention.

FIG. 1A shows subscriber $PS_A 216$ beginning to move from coverage area 212 to coverage area 213. A handover process will be initiated to allow subscriber $PS_A 216$ (personal station) to begin communicating with another base station and terminate communications with the current base station.

FIG. 1A includes radio port controller (RPC) 210, which is coupled to base station 214 and base station 215. RPC 210 is coupled to wired network 211. Thus, mobile subscribers in the coverage areas of the respective base stations are able to communicate through the base stations, and then through RPC 210, to wired network 211. Note that base stations may also be referred to as radio ports (RPs). Wired network 211 may represent the public switched telephone network (PSTN), or other communications network. Thus, mobile subscribers can communicate with a telecommunications network through the base stations and RPC 210. As shown, subscriber $PS_A 216$ is currently communicating with base station 214 over a wireless link 240. Subscriber $PS_A 216$ is currently in coverage area 212 of base station 214. This coverage area 212 overlaps with coverage area 213 of base station 215. Subscriber $PS_B 217$ is currently communicating with base station 215 via wireless link 241.

FIG. 1A shows that subscriber $PS_A 216$ is communicating over a wireless link 240 with base station 214 via timeslots within respective frames. As shown, subscriber $PS_A 216$ is communicating using for communications traffic timeslot 221 of frame 228 and the same timeslot 227 of frame 229. Frame 228 as shown includes timeslots 218–221, and frame 229 includes timeslots 224–227. Since each frame shows four timeslots, corresponding slots 221 and 227, which are both the fourth timeslots of their respective frames, are the same timeslot. In an actual system, a frame may contain a larger number of timeslots. Also included in a frame is typically a control signal, here shown as $C_1 218$ and $C_1 224$. Such control signal may occur only on certain intervals of frames, rather than every frame, according to the parameters of the system. Arrow 242 points in the direction of coverage area 213 from coverage area 212 and indicates that subscriber $PS_A 216$ is moving toward coverage area 213 from coverage area 212.

Subscriber $PS_B 217$ is also communicating with a local base station. As shown, subscriber $PS_B 217$ is communicating via wireless link 241 with base station 215. This communication traffic is also being carried by a timeslot on a frame. As shown here, communication is taking place on timeslot 233 of frame 238 and the same timeslot, timeslot 237 of frame 239. Such communication, in this example, is taking place at a different frequency from the one at which communication is taking place between subscriber $PS_A 216$ and base station 214. Subscriber $PS_B 217$ is also receiving and/or transmitting control information on a designated timeslot of a frame, shown here as $C_2$, timeslot 231 and $C_2$, timeslot 235.

The handoff between base station 214 and 215 occurs, according to an embodiment of the invention, in a manner that helps to allow for low cost equipment, lower weight, and high reliability. Such advantages are achieved through the choice of a timeslot with which the mobile subscriber communicates with additional base stations. Through judicious choice of timeslots, cost, weight, and power requirements of additional, more complex equipment can be avoided.

The initiation of the handoff of subscriber $PS_A 216$ between base station 214 and 215 may occur based on signal quality in the communication between the subscriber and the respective base stations. For example, the initiation of communication may occur when signal quality with the second base station is above a certain level. The termination of communication may occur when signal quality with either the first or second base station is below a certain level.

Figure 1B:
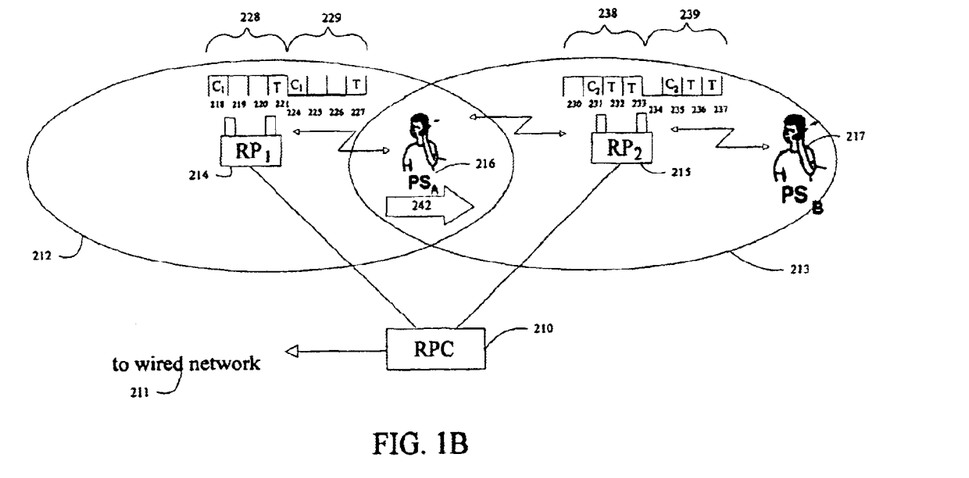

FIG. 1B shows subscriber $PS_A 216$ communicating with both base stations, base station 214 and base station 215. Such configuration may have resulted from subscriber $PS_A 216$'s movement from the coverage area of base station 214 (area 212) to the coverage area of base station 215 (area 213). As signal quality of potential communication with base station 215 improves, according to one embodiment of the invention, subscriber $PS_A 216$ requests a communications link with base station 215.

As shown in FIG. 1B, subscriber $PS_A 216$ is communicating with timeslot based wireless links 240 and 250 with base stations 214 and 215 respectively. A different timeslot is used to communicate with each of the respective base stations. As shown, timeslot 221 in frame 228, which subscriber $PS_A 216$ is using in communication with base station 214, is next to timeslot 232 of frame 238, which is used for communication in wireless link 250 with base station 215. That is, timeslot 221 is the fourth timeslot of the frame, and timeslot 232 is the third timeslot of the frame. The frequency used to communicate in these timeslots is the same for timeslot 221 and timeslot 232. This allows a radio of subscriber $PS_A 216$ to use the adjacent timeslots, even when such radio is not capable of quickly switching between frequencies. A base station has multiple separate radios and thus, for example, timeslot 232 and adjacent timeslot 233 have different frequencies for communicating with the different respective subscribers, subscriber $PS_A 216$ and subscriber $PS_B 217$. According to another example, subscriber $PS_A 216$ may communicate with different base stations using different frequencies, provided that the timeslots on which the communication takes place are not adjacent. Base station equipment or other equipment in the system may make a determination whether to initiate communication in a timeslot adjacent to one currently in use by the subscriber or one not adjacent, depending on availability of timeslots and frequencies and/or interference conditions from other users of such timeslots in the system.

Figure 1C:
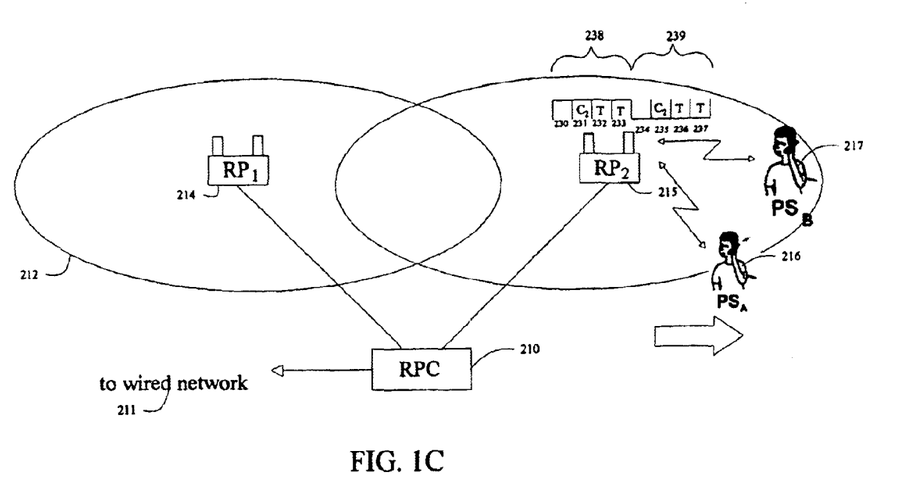

FIG. 1C shows a system according to the embodiment of the invention in which subscriber $PS_A 216$ has moved out of the coverage area of base station 214 then has dropped base station 214. Thus, now subscriber $PS_A 216$ is communicating via wireless link 250 with base station 215 and is no longer communicating with base station 215. Subscriber $PS_A 216$ communicates with base station 215 via timeslot 232 of frame 238, and the same timeslot 236 of frame 239. Subscriber $PS_B 217$ communicates via wireless link 241 with base station 215 using timeslot 233 of frame 238 and the same timeslot 237 of frame 239. Different frequencies are used on timeslots 232 and 233. Arrow 242 shows that subscriber $PS_A 216$ has moved from coverage area 212 of base station 214.

Figure 2A:
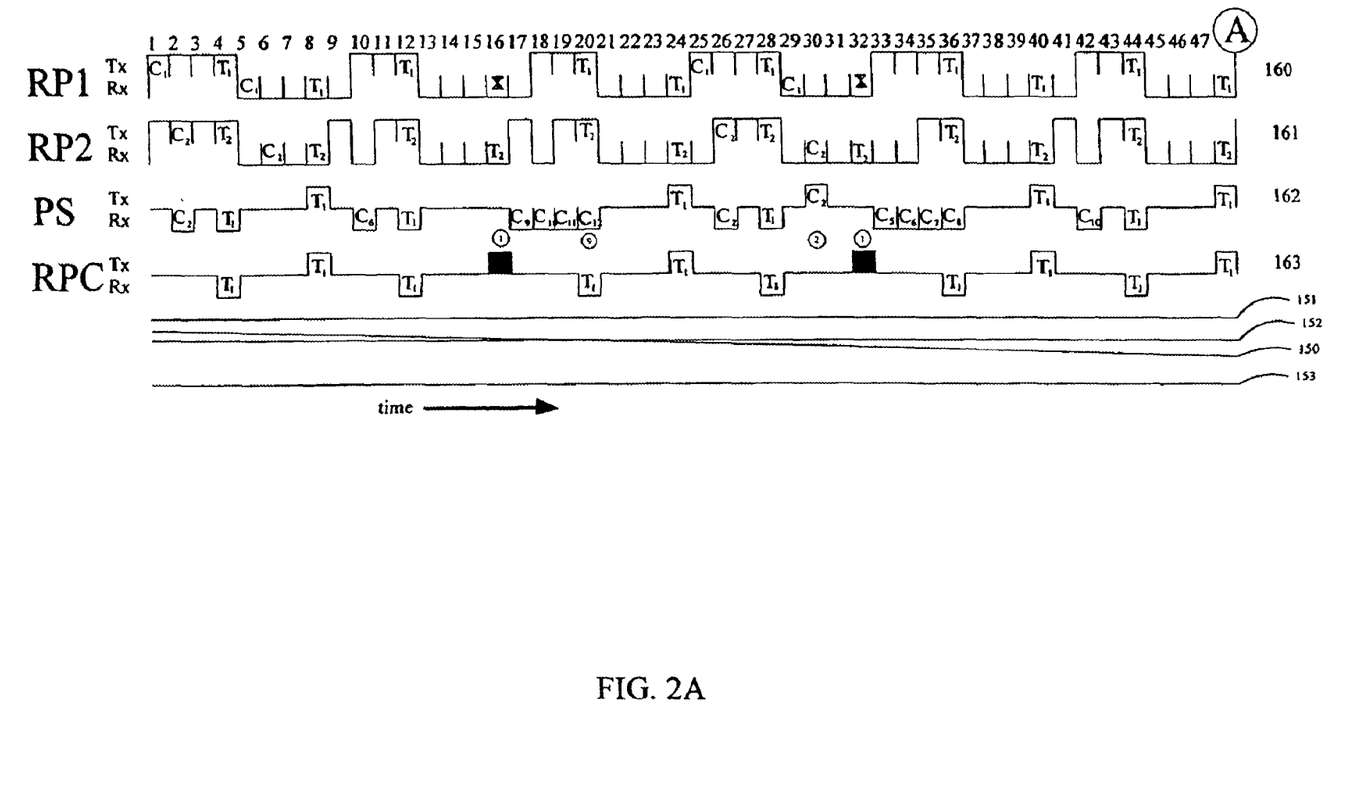
FIGS. 2A, 2B and 2C provide a sequential timing diagram illustrating communications activity between a subscriber, base stations, and base station controller, according to an embodiment of the invention.
Figure 2B:
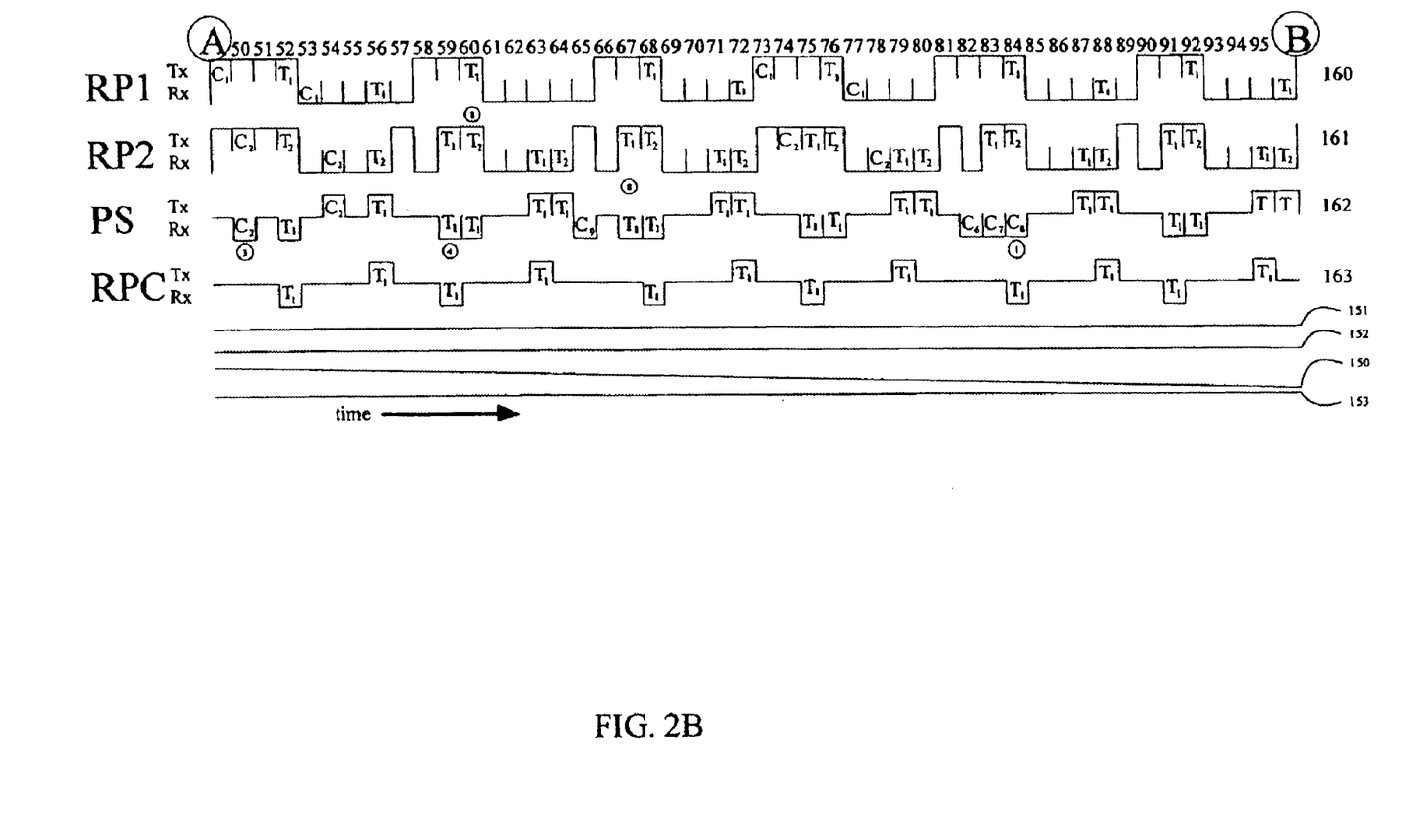
Figure 2C:
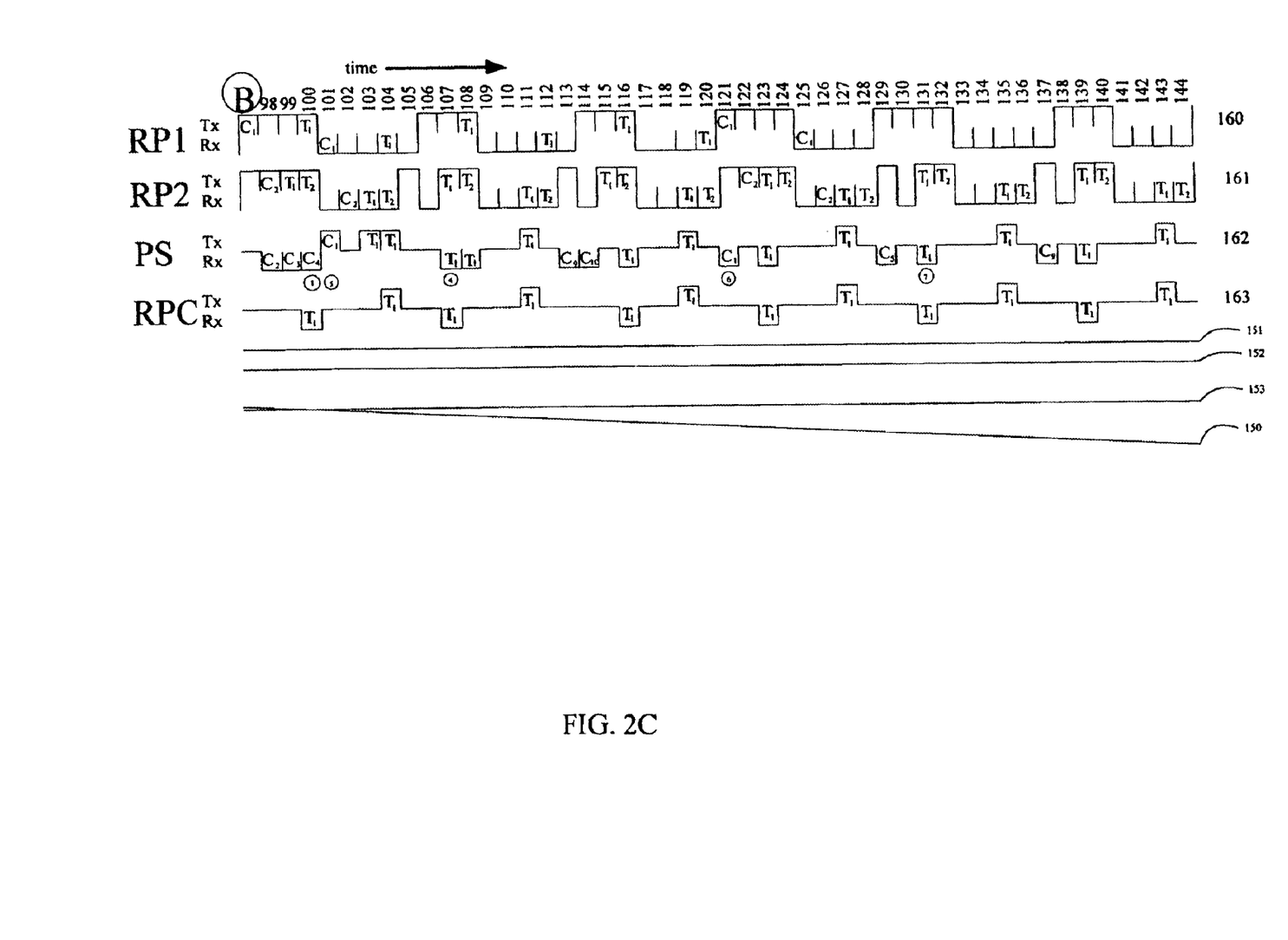

FIGS. 2A, 2B and 2C are a timing diagram illustrating communications activity between a subscriber, base stations, and base station controller, according to an embodiment of the invention. FIG. 2A illustrates a handover in which subscriber (communication with subscriber represented by PS trace 162) is initially communicating with a first base station (RP1 trace 160) and is handed off to a second base station (RP2 trace 161). Timeslots are numbered as positions 1–144. Communication with the radio port controller (RPC) is represented by RPC (trace 163). A radio port controller is coupled to both the first base station and second base station and communicates with a telecommunications network such as PSTN, thus allowing a mobile subscriber to communicate with the public switched telephone network.

In parallel to the communication with the mobile telephone equipment represented by trace PS 162, the first base station and the second base station (represented by RP1 and RP2) are communicating with other mobile telephone equipment. For example, traffic timeslot $T_2$ on timeslots 4 and 8 of trace RP2 161 (e.g., at positions 4, 8, 12, 16, etc.) represent communication with another mobile telephone equipment.

According to an embodiment in the invention, the handover is initiated based on signal quality in the link or potential link with the respected base stations. As shown here, thresholds exist for initiating a connection (connect_destination_RP_threshold 152) and for dropping communication (drop_origin_RP_threshold 153). When signal quality of communication with the first base station (trace 150) drops below the connect_destination_RP_threshold 152, the mobile subscriber equipment attempts to make a connection with another base station. When the signal quality with the initial base station drops below the drop_origin_RP_threshold 152, the base station drops communication with the original base station, or initiates the termination of communication with the initial base station.

The second base station is selected based upon potential signal quality with the second base station. According to one embodiment of the invention, such signal quality is measured by the mobile telephone measuring control signals from various base stations. The mobile telephone may maintain an ordered list of various base stations, ordered based on respective signal quality. Such lists may be updated periodically by the mobile telephone. FIG. 2A shows such measurements being taken (e.g., at positions 17–20).

The traces shown include a series of TDMA frames and each frame includes a number of timeslots. As shown here, each time frame includes eight timeslots constituting four down-link slots followed by four up-link slots. Each timeslot may use a different frequency, subject to constraints of the mobile telephone unit. The mobile telephone can use a different frequency only on non-adjacent timeslots. The base station can use an arbitrary frequency on each timeslot. As shown here, each timeslot in the down link corresponds to a timeslot in the up-link four timeslots later (e.g. positions 4 and 8 of trace PS 162). One of the timeslots on the down-link and one of the timeslots on the up-link are reserved for the control channel at a single frequency $F_{control}$. The control timeslot is transmitted every N time frames and different base stations transmit the control channel in different slots so that only one base station transmits the control carrier at any one time in an area in which it may cause interference to control channel transmissions from other base stations. In FIG. 2A, 2B and 2C, a super frame of N=3 frames is shown for illustrative purposes. Those skilled in the art will appreciate that a practical system using TDMA frame structure would more likely use a super frame of 20 frames. As shown, base station 1 shown in trace 160 transmits its control channel on timeslot number 1 and receives it on timeslot number 5. In the example of FIGS. 2a, 2b and 2c, 12 base stations with control channels $C_1$–$C_{12}$ are accommodated in consecutive timeslots every 3 frames. It will be appreciated that the control channel may also be implemented through means other than the separate timeslots shown in the illustrative example.

The radio port controller (RPC), to which the base stations are connected, assigns timeslots and carrier frequencies as well as providing the interface between the frames transmitted over the air and land line network. Depending on the type of interface to the land line wired network, the RPC may perform multiplexing, framing, adding error correction coding, de-framing, de-multiplexing, etc. The RPC time line trace 163 does not include such operations and merely illustrates which frames are received (RX, for the wire network to the base stations) and transmitted (TX, from the base stations to the wire network) by the RPC. The base stations connected to the RPC are synchronized (e.g. by the RPC) so that the boundaries of timeslots fall within the limits of the guard time intrinsically built into TDMA timeslot structure.

As shown in FIG. 2A, the subscriber telephone is communicating first with a first base station, represented by RP1 (trace 160). As shown, communication is on a given timeslot, shown here, for example, as $T_1$ on position 4 (the base station transmitting to the subscriber equipment) and $T_1$ on position 8 (the subscriber equipment transmitting to the base station). A control communication takes place, for example, on timeslot 1 and timeslot 5 (positions 1 and 5 respectively).

On the idle timeslot nonadjacent to the timeslot used for traffic, the mobile telephone equipment monitors the link quality from the other base stations. Depending on the layout of the control timeslot used by the individual base stations, the mobile telephone equipment may skip one frame of communications every N frames to monitor the 2 base stations whose downlink control slot may be adjacent to the timeslot which the mobile telephone equipment is currently using for communications. By shifting the frame in which the mobile telephone equipment skips the communications with the base station relative to the repeat period of the control channel transmissions and successive super frames, the mobile telephone equipment can monitor all the base stations in the system. This introduces loss of only one frame which is unnoticeable to the subscriber if the frame length is chosen short enough and N is chosen large enough. This is indicated by instances marked ①  and ⑨ , e.g. positions 16, 20, 32, 84 and 100. For example, at position 16 the mobile telephone equipment is monitoring signal quality from base stations in subsequent timeslots and thus does not communicate with traffic with the base station during that timeslot. In FIG. 2A for brevity's sake the processor shifting and the skipping frame is shown only in the first two instances of the N frames. Moreover, if the mobile telephone equipment adheres to a fixed rule of choosing which frame it skips communications, the RPC can substitute a replica of the last valid timeslot as a substitute for the missing timeslot and further reduce the impediment to voice quality as perceived by the wired network connection.

As shown in FIG. 2A, the second base station is communicating with another mobile telephone equipment using another frequency, the same timeslot at which the mobile telephone equipment is communicating with the first base station. For example, see positions 4 and 8 of trace 161 in which the second base station is communicating with another mobile telephone equipment while the first base station, represented by trace 160, is communicating on another frequency. As shown, for example, in position 4, the telephone equipment represented by trace 162 is communicating on one frequency represented by $T_1$ with the first base station represented by trace 160 and $T_1$, while the second base station, represented by trace 161, is communicating with a second telephone equipment on a second frequency represented by $T_2$. Throughout this diagram, $T_1$ represents traffic transmission at a first frequency and $T_2$ represents traffic transmission on a second frequency to an unrelated mobile telephone (i.e., first and second frequency may be the same).

Eventually the signal quality of communication between the telephone equipment and the first base station may degrade such that it is below the connect threshold. As shown here, trace 150 drops below connect_destination_ RP_threshold 152. As shown here, this takes place around position 24 and 25. As a result, the telephone equipment sends a link establishment request to the base station with the best link quality, the destination base station in the example of FIG. 2A, this is RP2 at instant ② (position 30). The mobile telephone equipment then advises the destination base station of the telephone equipment's current timeslot and frequency on the first base station. Thus $C_2$ at position 30 represents a control message from the telephone equipment requesting a link establishment. Depending on the location of the telephone equipment's control channel relative to the communication timeslot used by the telephone equipment, this message may require an interruption of one frame in the communications with the first base station. This interruption is unnoticeable in a system with judiciously chosen N (large) and frame length (short). While unnecessary for handover to another base station connected to the same RPC (because the RPC knows which timeslot and frequencies are used by the mobile telephone equipment), according to one embodiment of the invention, the current timeslot and frequency are included in the message requesting the link establishment to allow for connection with a base station not belonging to the same radio port controller.

The second base station checks whether it has a timeslot available which is different from the one already in use by the mobile telephone equipment and with interference conditions such that the same frequency can be used if the free timeslot is adjacent to the one already in use by the mobile telephone equipment with the first base station. The table below illustrates the allowed timeslot and frequency combinations if the first timeslot is used for the control channel (A represents a particular frequency, frequency A):

| Timeslot / Frequency Already in Use to Communicate with First Base Station | Allowed Timeslot / Allowed Frequency to Communicate with Second Base Station |
| --- | --- |
| Timeslot 2 / Frequency A | Timeslot 3 / Frequency A or Timeslot 4 / Any Frequency |
| Timeslot 3 / Frequency A | Timeslot 2 / Frequency A or Timeslot 4 / Frequency A |
| Timeslot 4 / Frequency A | Timeslot 2 / Any Frequency or Timeslot 3 / Frequency A |

If a suitable timeslot is available, the second base station sends a link assignment directive to the mobile telephone equipment. From the next frame onward, the mobile telephone equipment communicates over two timeslots, the original timeslot to the first base station and the newly assigned timeslot to the second base station. For example in FIG. 2B at position 50, $C_2$ represents a control message from the second base station sending a link assignment to the mobile telephone equipment. Subsequently the mobile telephone equipment is communicating with both base stations. For example, in position 59 (traces 161 and 162) the mobile telephone equipment is communicating on frequency one with the second base station, and in position 60 (traces 160 and 162) the mobile telephone equipment is communication with the first base station on the same frequency. These traffic communications are taking place over the same frequency and thus are allowed to occur on adjacent timeslots.

For example, the second base station may reallocate timeslots to accommodate one subscriber if the second base station does not have a timeslot available different from the one already in use by the mobile telephone equipment, but does have a timeslot available which is the same as the timeslot already in use by the mobile telephone equipment, it will send a command to a second PS which is using the different timeslot directing the second mobile telephone equipment to switch to the same timeslot as the first mobile telephone equipment thus freeing up the different timeslot for use by handover from the first mobile telephone equipment. The RPC knows which timeslots and frequencies are in use by a base station and the topology of the base station. Therefore it can make a good estimate of which of the mobile subscribers could be switched in order to make room for the handover without violating interference constraints and how frequencies may be reassigned. The RPC can then calculate how long the process of clearing the timeslot for the handover will take. The RPC can advantageously use this knowledge to clear available timeslots in advance of likely handovers. The base station responds to the link establishment request from the telephone equipment in such a situation with a link assignment reject message containing time estimate of how many frames will be needed to clear a suitable timeslot at which the first telephone equipment is invited to retry its link assignment request. Upon receipt of the link assignment reject message, the first mobile telephone equipment will then revert to communicating with the first base station in order to minimize lost frames.

The mobile telephone equipment then tries to communicate with another (third) base station if another base station with suitable link quality is available. Such attempt is the initiation of a link assignment process. If link assignment is successful on the third base station, the mobile telephone equipment sends a message to cancel link establishment to the second base station so that the second base station knows that it does not need to reserve a timeslot for the first mobile telephone equipment. If the link assignment attempt on the third base station is unsuccessful, the mobile telephone equipment revisits the second base station or the third base station after expiration of the time estimate received in the link assignment reject message. If the time estimates from the different base stations end up in the same TDMA time frame, the base station preferentially retries the link assignment process with the base station which has the best link quality. Using this process the mobile telephone equipment queues its link assignment with multiple base stations (3 being the example in the illustrative sequence above), each of which is a suitable handover candidate.

After receiving the link assignment message, the mobile telephone equipment starts to communicate with the second base station in the same frame as the first base station, using a different timeslot for each link. Based on the respective qualities of the links between the different base station, the mobile telephone equipment selects the best timeslot for further processing, between the timeslots used for the different base stations. The radio port controller (RPC) receives data from both base stations and forwards the frame with the lowest frame error rate onto the network. In the down-link, the RPC sends incoming frames from the network to both base stations to which the mobile telephone equipment is connected. As shown here for example at position 59, RPC is using traffic from a different timeslot than it had in previous frames, based on the better quality of the signal from second base station as compared to the first base station. At position 68 the traffic from the first base station is selected for further transmission onto the network, presumably because the signal quality from the first base station is better than that of the second base station at that point in time.

As shown in positions 59–108 the mobile telephone equipment is communicating traffic with both base stations, the first base station and the second base station on timeslots 3, 4, 7 and 8. For reception the mobile telephone equipment uses 3 and 4, and for transmission it uses timeslots 7 and 8.

The mobile telephone equipment drops communication with a base station when the link quality of communication with that base station is too low. As shown here, the mobile telephone equipment drops communication with a base station when the quality of the communication with the base station is below a particular threshold (drop_origin_RP_threshold 153). As shown, trace 150, which represents signal quality in the link between the mobile telephone equipment and the first base station, drops below the drop_origin_RP_threshold 153 around position 97. The mobile telephone equipment sends a link cancel message to the base station for which the signal quality has dropped below the threshold. As shown here in FIG. 2C, the link cancel message is sent at position 101 as control $C_1$ message from PS (trace 162) to the first base station (trace 160). The RPC sends a link cancel acknowledgement to the mobile telephone equipment, and then the mobile telephone equipment drops connection to the base station. Alternatively, the link may have deteriorated to the point that the link cancel message or its acknowledgement are lost. In such a case, the mobile telephone equipment automatically drops the link to the first base station and the RPC automatically drops the link to the mobile telephone equipment from the first base station on its own initiative upon detecting that the link quality as seen by the first base station has dropped below the drop_origin_RP_threshold_at_RP. At this point, the mobile telephone equipment is fully connected to the other base station on every frame and the RPC no longer needs to select between frames between the two base stations, regardless of whether the link to the first base station is dropped in a control fashion or through default by exceeding a predetermined threshold. The threshold drop_origin_RP_threshold is chosen to be at a predetermined link quality level which corresponds to the threshold between good and poor subjective voice quality, according to an embodiment in the invention.

As shown here, starting with position 111, the mobile telephone equipment is communicating only with the second base station, represented by trace 161. The RPC acknowledges that the first base station has been dropped at position 121 marked with a ⑥. At this point, the mobile telephone equipment is completely handed over to the second base station.

The effect on system quality can be throttled by how much larger a connect_destination_RP_threshold is chosen than the drop_origin_RP_threshold. If connection_destination_RP_threshold is set very high, a mobile telephone equipment will be connected to multiple base stations almost all the time. Under such condition, the system capacity is effectively cut in half compared to a system in which there is no seamless handover. In such a situation in which a mobile telephone equipment is connected to multiple base stations almost all the time, fairly reliable handover is provided even in cases where the signal from one base station dropped suddenly such as may occur when a subscriber walks or turns around a corner in an urban setting. If the connect_destination_RP_threshold is set only slightly larger than the drop_origin_RP_threshold, then the mobile telephone equipment looks for a connection to a second base station only when it can reasonably assume that handover will be needed. Such a situation would occur for example when a subscriber moves from one cell to another cell. If connect_destination_RP_threshold is set to small, the process for establishing a link to the second base station may not have enough time to complete before the signal quality from the originating base station becomes unusable. Such a situation may occur when a subscriber moves fast relative to the cell size. The best setting for connect_destination_RP_threshold is a compromise between the ability to respond to sudden changes in signal strength and reduction in system capacity.

A further reduction in mobile telephone equipment power consumption may be advantageously achieved by restricting the search for the second base station to those times when link quality from the first base station is below a threshold, say search_for_other_RP_threshold (search_for_other_RP_threshold>connect_destination_RP_threshold>drop_origin_RP_threshold). As long as the link quality on its active timeslot is above search_for_other_RP_threshold, the mobile telephone equipment turns off its receiver on idle timeslots, according to one embodiment of the invention.

Figure 3:
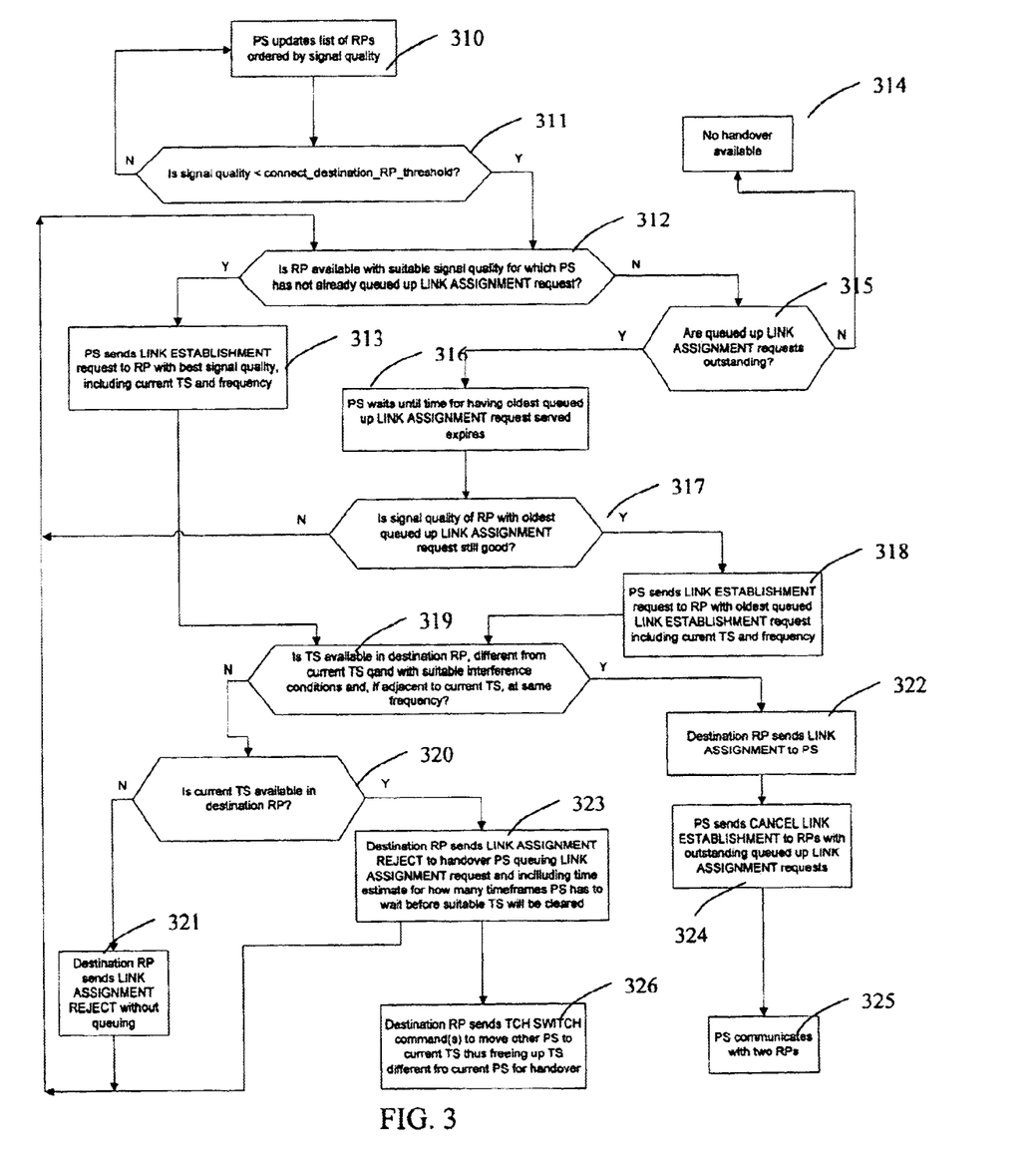
FIG. 3 is a simplified flow chart of a handover process, according to an embodiment of the invention.

FIG. 3 is a simplified flow chart of a handover process, according to an embodiment of the invention. FIG. 3 shows different approaches of various embodiments of the invention which may be used individually or in various combinations. For example, it is shown that a timeslot for communication between a mobile telephone equipment and a second base station is selected as a timeslot next to the one being used to communicate with the first base station only if such timeslot is on the same frequency as the one being used to communicate with the first base station. Another aspect of the flow chart is the use of a threshold to determine whether the mobile telephone equipment should attempt to connect with a second base station. Yet another aspect of the flow chart is the use of a threshold to determine whether communication with the first base station should be dropped. Also shown is the reallocation of a timeslot being used by other mobile telephone equipment in a base station in order to allow mobile telephone equipment to communicate with both base stations. An example where such reallocation may occur is where the timeslot available on the second base station is the same timeslot being used by the mobile telephone equipment to communicate with the first base station. In such a situation, for example, the second base station may reallocate the other mobile telephone equipment that it is communicating with to the timeslot thus freeing another timeslot for use by the first mobile telephone equipment. When such reallocation is attempted, a message may be provided to the first mobile telephone equipment that indicates an estimate of the time to switch timeslots and make a timeslot for handover available. Another aspect of the flow chart is the measurement of signal quality of other base stations (RPs ordered by signal quality). Such measurement may be used to select the next base station to which to attempt to connect.

As shown in FIG. 3, the mobile telephone equipment (PS) updates the list of base stations (RPs) ordered by signal quality (block 310). If signal quality is not below the particular threshold, then the mobile telephone equipment continues to update its list of base stations ordered by signal quality (block 310). If signal quality of communication with the current base station is below a particular threshold (block 311), then proceed toward connecting with another base station. In particular, it is determined whether a base station (RP) is available with suitable signal quality for which the mobile telephone equipment (PS) has not already queued up a link assignment request (block 312).

If a base station is available with suitable signal quality for which the mobile telephone equipment has not already queued up a link assignment request, then the mobile telephone equipment (PS) sends a link establishment request to the base station (RP) with the best signal quality (block 313). The message includes the current timeslot and frequency used by the mobile telephone equipment to communicate with the current base station (block 313). Next determine whether a timeslot is available on the destination base station, and (1) whether it is different from the current timeslot with a suitable interference condition and, (2) if it is adjacent to the current timeslot, whether it is at the same frequency (block 319). If these conditions are met, then the destination base station (RP) sends a link assignment to the mobile telephone equipment, letting the mobile telephone equipment know it may connect to the base station (block 322). The mobile telephone equipment sends a cancel link establishment to base stations (RPs) that have outstanding queued-up link assignment requests (block 324). Then, the mobile telephone equipment (PS) communicates with both base stations (RPs) (block 325).

If a timeslot was not available in the destination RP, different from the current timeslot and with suitable interference condition or, if adjacent to the current timeslot at the frequency (block 319), then it is determined whether the current timeslot is available in the destination base station (RP) (block 320). If such current timeslot is not available in the destination base station (RP), then the destination base station (RP) sends a link assignment reject message without queuing the mobile telephone equipment (block 321). Next, the mobile telephone equipment returns to determining whether there is a base station available with suitable signal quality for which the mobile telephone equipment has not already queued up a link assignment request (block 312).

If a current timeslot is available in the destination base station (RP) (block 320), then the destination base station sends a link assignment reject to the mobile telephone equipment queuing a link assignment request including a time estimate for how many time frames the mobile telephone equipment (PS) has to wait before a suitable timeslot will be cleared (block 323). Next, the destination RP sends a TCH (traffic channel) switch command(s) to move the other mobile telephone equipment to the current timeslot. By moving the other telephone equipment to the current timeslot, a timeslot different from the current timeslot is freed for the mobile telephone equipment for a handover (block 326). In the meantime, the mobile telephone equipment continues to determine whether a base station is available with suitable signal quality for which the mobile telephone equipment has not already queued up a link assignment request (block 312).

If such a base station is not available with suitable signal quality for which the mobile telephone equipment has not already queued up link assignment request (block 312), the mobile telephone equipment determines whether there are any queued up link assignment requests outstanding (block 315). If such link assignments outstanding are not present, then no handover is available (block 314). If such a link assignment request is outstanding, the mobile telephone equipment waits until the first queued up link assignment request served is expired (block 316). If the signal quality of the first available base station with a link assignment is still good (block 317), then the mobile telephone equipment sends a link establishment request to such base station, and such request includes the current timeslot and frequency used to communicate with the current base station (block 318). Next, proceed to block 319 to check whether a timeslot is available in the destination base station different from the current timeslot and with suitable interference condition and if adjacent to the current timeslot at the same frequency (block 319). Then, proceed as described above with relation to what happens after completing block 319.

Figure 4:
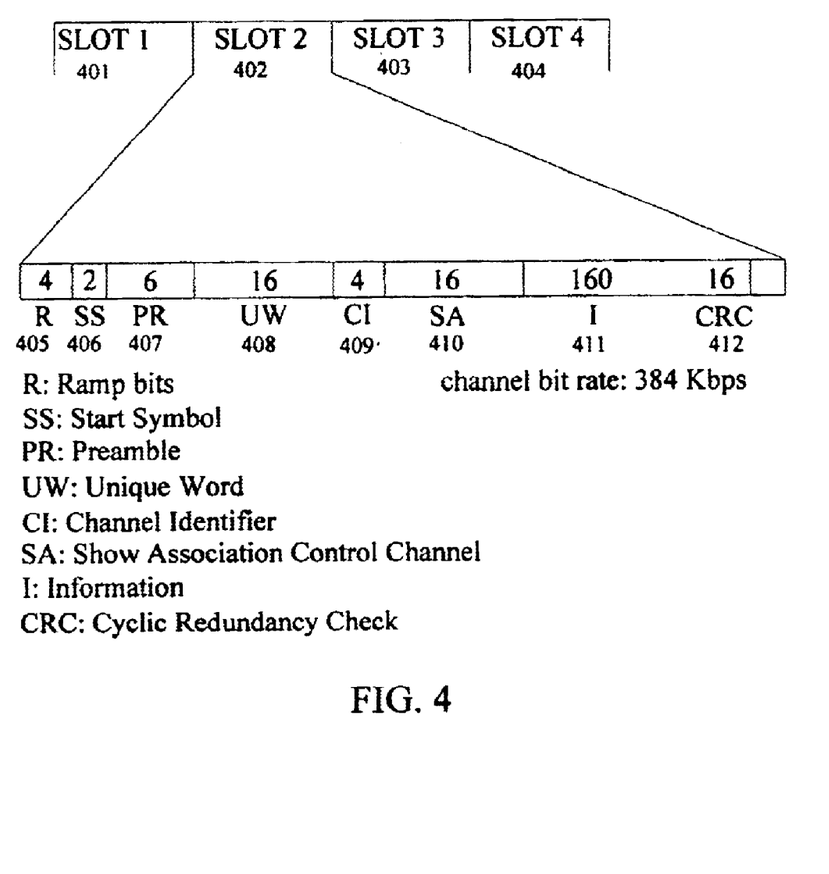
FIG. 4 shows a sample half-frame structure following the Personal Handyphone System standard (also known as ARIB RCR STD-28), showing time available in the ramp bits to switch channels between timeslots, according to an embodiment of the invention.

FIG. 4 shows a sample half-frame structure following the personal handy phone system standard (also known as ARIB RCR STD-28), showing the relatively short time available in the ramp bits to switch channels between timeslots, according to an embodiment of the invention. A set of timeslots as would be used in a communication with a mobile telephone are shown (slot 1 401, slot 2 402, slot 3 403, and slot 4 404). Each slot, according to the embodiment shown, is 0.625 ms in length. The channel bit rate is 384 Kbps. A typical half-frame includes ramp bits 405 (4 bits), start symbol 406 (2 bits), preamble 407 (6 bits), unique word 408 (16 bits), channel identifier 409 (4 bits), slow associated control channel 410 (16 bits), information 411 (160 bits), and cyclic redundancy check 412 (16 bits). The particular format of timeslots may be different, depending on the embodiment of the invention. For example, embodiments of the invention may apply to systems in which timeslots contain information in a digital format as well as to systems where timeslots contain information in an analog format.

The above description of a timeslot applies to certain embodiments of the invention. Other embodiments of the invention are directed to systems with other timeslot formats, including formats in which timeslots contain information in a digital format, as well as formats where timeslots contain information in an analog format.

Figure 5:
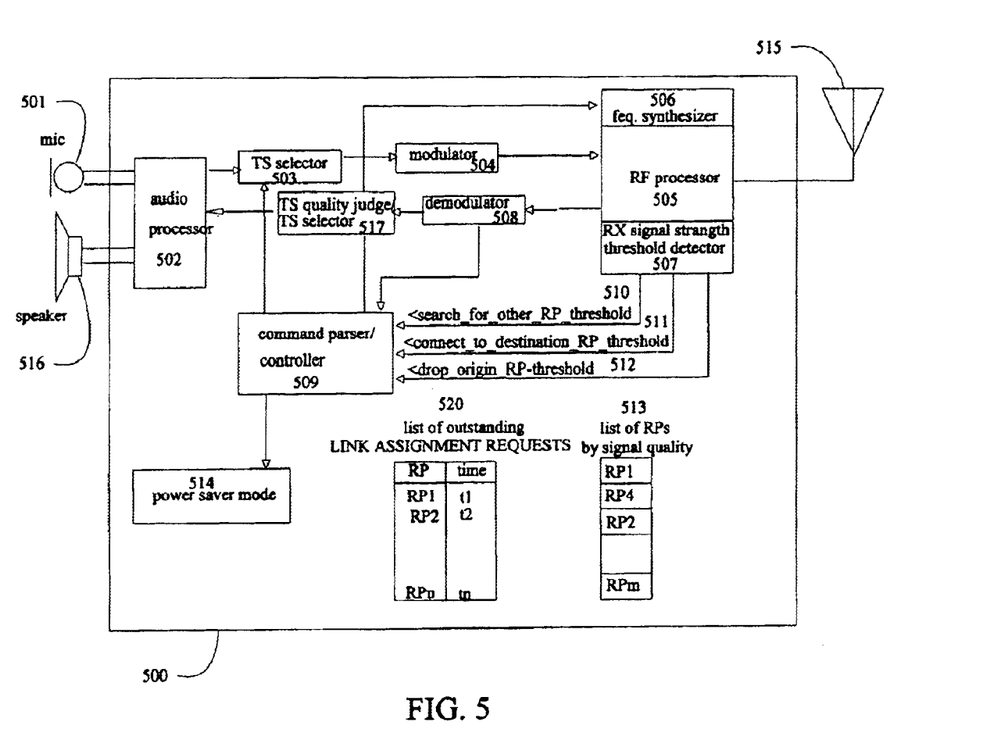
FIG. 5 is a block diagram of a personal station, according to an embodiment of the invention.

FIG. 5 is a block diagram of a personal station, according to an embodiment of the invention. A personal station 500 may have one of various types of architectures. The architecture shown is architecture according to one embodiment of the invention. A user communicates with the station by a microphone 501, which is coupled to an audio processor 502. Audio processor 502 is coupled to a speaker 520. A timeslot selector 503 receives information from audio processor 502 and passes such information to modulator 504, which is coupled to RF processor 505. Timeslot selector 503 also receives control from command parser/controller 509. RF processor 505 passes signals to demodulator 508, which forwards information to command parser/controller 509 and timeslot quality judge/timeslot selector 517. Timeslot quality judge/timeslot selector 517 has an input to audio processor 502. Receive signal strength threshold detector 507 is coupled into command parser/controller 509. Control command parser/controller 509 programs the RX signal strength threshold detector 507 to report to parser/controller 509 when the signal exceeds the following thresholds: search_for_other_RP_threshold 510, connect_to_destination_RP_threshold 511, and drop_origin_RP_threshold 512. Command parser/controller 509 is coupled into timeslot selector 503, timeslot quality judge/timeslot selector 517, and power save mode 514. Frequency synthesizer 506, which receives a control from command parser/controller 509, is coupled to RF processor 505. RF processor 505 is coupled to RX signal strength threshold detector 507 and to antenna 515. Personal station 500 also includes a list of outstanding link assignment requests 520 and a list of radio ports (base stations) ranked by signal quality 513.

Alternative Embodiments

The techniques and systems described above may also apply to a system in which mobile telephone equipment connects to more than two base stations. In such a configuration, according to one embodiment, every N-th frame is used for communications to the N-th base station and data streams for N base stations are interleaved.

The methods and systems described above may apply in a system in which the time frames are interleaved in a hierarchical fashion for devices connecting to different RPCs. Such a configuration, synchronization of the base stations is achieved other than by the RPCs, according to an embodiment of the invention.

Conclusion

The foregoing description of various embodiments of the invention has been presented for purposes of illustration and description. It is not intended to limit the invention to the precise forms disclosed.

What is claimed is:

1. A method of seamless handover in a telecommunications system, the method including:
when a mobile telephone has established communication with a first base station on a particular timeslot in a frame, if another timeslot is available in the frame in a second base station, (a) establishing communication within the frame with the second base station on the another timeslot in the frame, the another timeslot not next to the particular timeslot if the frequencies used on the particular timeslot and the another timeslot are different and (b) if the frequencies used on the particular timeslot and the another timeslot are the same, establishing communication with the second base station on the another timeslot in the frame, the another timeslot being next to the particular timeslot or not next to the particular timeslot and continuing communication simultaneously with both the first and second base station.

2. The method of claim 1, wherein the simultaneous communication with the second base station is established if signal quality of communication with the first base station is below a particular level.

3. The method of claim 1, wherein communication with a base station is dropped if signal quality of communication with the base station is below a particular level.

4. The method of claim 1, including, to achieve a desired system capacity, adjusting a combination of (a) a particular level of signal quality of communication with the first base station below which the circuitry attempts to establish communication with the second base station and (b) a particular level of signal quality of communication with a base station below which the circuitry drops communication with the base station.

5. The method of claim 4 including performing the adjusting automatically based on measured utilization of system resources and desired communication link reliability.

6. The method of claim 1, including selecting the second base station from among a set of base stations based on signal quality between the base stations and the mobile telephone.

7. The method of claim 1, including selecting as the second base station a base station having the best signal quality between the base station and the mobile telephone, from among base stations other than the first base station.

8. The method of claim 7, including selecting as the second base station a base station based on RSSI.

9. The method of claim 7, including selecting as the second base station a base station based on FER.

10. The method of claim 1, including reallocating a timeslot currently in use in the second base station by a second phone to allow the reallocated timeslot to be used by the mobile telephone.

11. The method of claim 10, including providing the mobile telephone an estimate of time to prepare the another timeslot for communication with the second base station.

12. The method of claim 1, including selecting between a signal from the first base station and a signal from the second base station based on a frame error rate in the respective signals.

13. A method of seamless handover in a telecommunications system, the method including:
when a mobile telephone has established communication with a first base station on a particular timeslot in a frame wherein the frame comprises two half frames, and each half frame comprises no more than six timeslots, if another timeslot is available in the frame in a second base station, (a) establishing communication simultaneously within the frame with the second base station on the another timeslot in the frame, the another timeslot not next to the particular timeslot if the frequencies used on the particular timeslot and the another times lot are different and (b) if the frequencies used on the particular timeslot and the another timeslot are the same, establishing communication with the second base station on the another timeslot in the frame, the another timeslot being next to the particular timeslot or not next to the particular timeslot.

14. The method of claim 13, wherein the simultaneous communication with the second base station is established if signal quality of communication with the first base station is below a particular level.

15. The method of claim 14, wherein communication with a base station is dropped if signal quality of communication with the base station is below a particular level.

16. The method of claim 13, including, to achieve a desired system capacity, adjusting a combination of (a) a particular level of signal quality of communication with the first base station below which the circuitry attempts to establish communication with the second base station and (b) a particular level of signal quality of communication with a base station below which the circuitry drops communication with the base station.

17. The method of claim 16 including performing the adjusting automatically based on measured utilization of system resources and desired communication link reliability.

18. A method of seamless handover in a telecommunications system, the method including:
when a mobile telephone has established communication with a first base station on a particular timeslot in a frame,
determining available timeslots in the frame in a second base station;
determining available frequencies from the second base station;
establishing communication within the frame with the second base station on any selected one of the available timeslots in the frame if the frequencies to be used on the particular timeslot and the selected timeslot are the same and, if the frequencies to be used on the particular timeslot and the selected timeslot are different, choosing a selected one of the available timeslots not next to the particular timeslot for establishing communication with the second base station; and, continuing simultaneous communication within the frame with the first and second base station.

19. The method of claim 18, wherein the simultaneous communication with the second base station is established if signal quality of communication with the first base station is below a particular level.

20. The method of claim 19, wherein communication with a base station is dropped if signal quality of communication with the base station is below a particular level.

21. The method of claim 18, including, to achieve a desired system capacity, adjusting a combination of (a) a particular level of signal quality of communication with the first base station below which the circuitry attempts to establish communication with the second base station and (b) a particular level of signal quality of communication with a base station below which the circuitry drops communication with the base station.

22. The method of claim 21 including performing the adjusting automatically based on measured utilization of system resources and desired communication link reliability.

23. The method of claim 18, including reallocating a timeslot currently in use in the second base station by a second phone to allow the reallocated timeslot to be selected by the mobile telephone.

24. The method of claim 23, including providing the mobile telephone an estimate of time to prepare a timeslot for reallocation for communication with the second base station.

* * * * *